(12) United States Patent
Martin et al.

(10) Patent No.: US 9,914,839 B2
(45) Date of Patent: Mar. 13, 2018

(54) STAIN REPELLENT AND VOC ELIMINATING COATINGS AND USE THEREOF

(71) Applicant: CertainTeed Corporation, Malvern, PA (US)

(72) Inventors: Darran L. Martin, Lafayette Hill, PA (US); Alan L. Boyd, Collegeville, PA (US)

(73) Assignee: CERTAINTEED CORPORATION, Malvern, PA (US)

( * ) Notice: Subject to any disclaimer, the term of this patent is extended or adjusted under 35 U.S.C. 154(b) by 0 days.

(21) Appl. No.: 14/503,011

(22) Filed: Sep. 30, 2014

(65) Prior Publication Data

US 2015/0094410 A1    Apr. 2, 2015

Related U.S. Application Data

(60) Provisional application No. 61/884,933, filed on Sep. 30, 2013.

(51) Int. Cl.
| | | |
|---|---|---|
| *C09D 133/10* | (2006.01) | |
| *C08K 13/02* | (2006.01) | |
| *C09D 5/16* | (2006.01) | |
| *C09D 133/08* | (2006.01) | |
| *C08K 3/22* | (2006.01) | |
| *C08K 3/26* | (2006.01) | |
| *C08K 3/32* | (2006.01) | |

(52) U.S. Cl.
CPC ......... *C09D 5/1625* (2013.01); *C09D 5/1606* (2013.01); *C09D 133/08* (2013.01); *C08K 2003/2241* (2013.01); *C08K 2003/265* (2013.01); *C08K 2003/327* (2013.01)

(58) Field of Classification Search
CPC ..... C09D 5/1625; C09D 133/10; C08K 13/02
USPC .......................................................... 524/189
See application file for complete search history.

(56) References Cited

U.S. PATENT DOCUMENTS

| | | |
|---|---|---|
| 7,041,727 B2 | 5/2006 | Kubicek et al. |
| 2003/0236340 A1 | 12/2003 | Kubicek et al. |
| 2007/0043159 A1* | 2/2007 | Bardman et al. ............. 524/501 |
| 2007/0241482 A1 | 10/2007 | Giller et al. |
| 2009/0130474 A1 | 5/2009 | Ishimoto et al. |
| 2010/0016151 A1 | 1/2010 | Caldwell et al. |
| 2010/0183889 A1 | 7/2010 | Dams et al. |
| 2010/0190021 A1 | 7/2010 | Ruba et al. |
| 2012/0132851 A1 | 5/2012 | Blanchard et al. |
| 2012/0245267 A1 | 9/2012 | Blanchard et al. |

FOREIGN PATENT DOCUMENTS

| | | |
|---|---|---|
| CN | 101338150 A | 1/2009 |
| EP | 1715009 | * 10/2006 |
| EP | 1411085 A1 | 4/2012 |
| JP | 1995-268163 | * 10/1995 |
| JP | H10330681 A | 12/1998 |
| JP | H11290433 A | 10/1999 |
| JP | 2005097337 A | 4/2005 |
| JP | 2007056259 A | 3/2007 |
| JP | 2012528711 A | 11/2012 |
| JP | 2013510216 A | 3/2013 |
| RU | 2243216 C2 | 12/2004 |
| RU | 2009149741 A | 12/2009 |
| WO | 2007004507 A1 | 1/2007 |
| WO | 2013012828 A1 | 1/2013 |

* cited by examiner

*Primary Examiner* — Deve E Valdez
(74) *Attorney, Agent, or Firm* — Abel Law Group, LLP; Alexander H Plache

(57) ABSTRACT

A coating dispersion or building article can include titanium dioxide, and a dihydrazide. The coating dispersion or building article can further include calcium carbonate, calcined aluminum silicate, acrylic polymers, and a fluoroalkyl polymer.

11 Claims, No Drawings

STAIN REPELLENT AND VOC ELIMINATING COATINGS AND USE THEREOF

CROSS-REFERENCE TO RELATED APPLICATION(S)

This application claims priority under 35 U.S.C. § 119(e) to U.S. Patent Application No. 61/884,933 entitled "Stain Repellent and VOC Eliminating Coatings and Use Thereof," by Darran L. Martin and Alan L. Boyd, filed Sep. 30, 2013, which is assigned to the current assignee hereof and incorporated herein by reference in its entirety.

FIELD OF THE DISCLOSURE

The invention relates to a building article having stain repellent coatings and containing a dihydrazide as an agent capable of trapping formaldehyde.

BACKGROUND

Highly varied composite materials are used in construction of dwellings, schools, hospitals, and offices, as well as of transportation vehicles. Some of these materials, such as sound and/or thermal insulators, wooden panels, furniture parts and decorative parts, use adhesives, paints and varnishes comprising formaldehyde-based resins. The proportion of free formaldehyde in these materials is kept at a very low level owing to the incorporation of a small amount of agents capable of trapping formaldehyde.

Moreover, in public places, schools, and hospitals, the panels, boards, and furniture parts are held in white or off white colors which require that they can be easily cleaned. Accordingly coatings that have acceptable stain repellency are in demand.

However, regulations regarding protection against undesirable emissions of products, such as formaldehyde, which may exhibit a risk to the health of the individual are becoming stricter and require a further reduction in the amount of free formaldehyde present in materials or capable of being emitted by materials over time.

Accordingly, there is a need for building and construction material that comply with the demanding regulation and are easily to clean.

SUMMARY

To achieve this aim, the present invention provides a stain repellent coating that at least one dihydrazide. A coating dispersion or building article can include titanium dioxide, and a dihydrazide. The coating dispersion or building article can further include calcium carbonate, calcined aluminum silicate, acrylic polymers, and a fluoroalkyl polymer.

DETAILED DESCRIPTION

A dihydrazide in accordance with the present invention corresponds to the following formula:

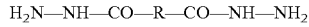

H$_2$N—NH—CO—R—CO—NH—NH$_2$ in which R represents a linear or branched alkylene radical preferably containing 1 to 18 carbon atoms, optionally substituted by one or more hydroxyl radicals; or an arylene, preferably phenylene or biphenylene, radical optionally substituted by one or more hydroxyl radicals, one or more halogen atoms, especially F, Cl or Br, or one or more linear or branched alkyl radicals containing 1 to 4 carbon atoms.

Advantageously, the dihydrazide is chosen from the dihydrazides for which the radical R is a $C_1$-$C_{12}$, preferably $C_1$-$C_8$ alkylene radical. The preferred dihydrazide is adipic acid dihydrazide. In embodiments, the amount of dihydrazide represents 0.1 to 20 wt %, such as 0.2 to 10 wt %, or 0.3 to 5 wt % of the coating.

In embodiments, the dihydrazide is present in coatings having stain and water repellency. Such properties can be achieved by mixing in a polymeric material into the dispersion. As examples, polymeric materials that may be used are polyolefin, for example of polyethylene, of polypropylene, of polyisobutylene and of polymethylpentene, of polyvinyl acetate (homopolymer or copolymer), for example of ethylene/vinyl acetate (EVA), of polyvinyl alcohol (homopolymer or copolymer), for example of ethylene/vinyl alcohol, of polylactic acid, of acrylonitrile, for example modacrylic (containing 35 to 85% of acrylonitrile units), of polyoxyalkylene, for example of polyoxyethylene, of polyoxyphenylene, of polyacrylic or of polyacrylate, for example of polymethyl methacrylate (PMMA), of polyester, especially of polyalkylene terephthalate, for example of polyethylene terephthalate and polybutylene terephthalate, of polyamide, of polyimide, of chlorinated and/or fluorinated polymer, for example of polyvinyl chloride, of polychlorofluoroethylene, of perfluoroethylene and of perfluoropropylene, of polysulfone, for example polyethersulfone, of polyurethane, especially elastane (at least 85% of thermoplastic polyurethane elastomer), of polybenzimidazole and of aramid.

Other polymers, that can be used are thermoplastic polymers, for example styrene/acrylonitrile, acrylonitrile/butadiene/styrene, cellulose (tri)acetate, expanded polystyrene, a polyolefin such as polyethylene and polypropylene, a poly (meth)acrylate, a polyvinyl acetate or a polyoxymethylene; a thermosetting polymer, for example an unsaturated polyester, an epoxide, a phenolic resin such as a novolac or a resol, in particular having a content of free aldehyde(s) of less than 0.05%, a polyimide, a polyurethane, a phenoplast or a biopolymer, for example a polysaccharide or a protein; an elastomeric polymer, for example a fluoropolymer, in particular based on vinylidene fluoride, neoprene, a polyacrylic, a polybutadiene, a polyether amide, a silicone, a natural rubber or styrene-butadiene rubber (SBR), or a biopolymer, for example a polysaccharide or a protein.

The polymers can be present in an amount from 2 to 30 wt %, such as 5 to 25 wt %, or 10 to 25 wt % of the coating.

In order to achieve stain repellency, the coating of interest can include fluoropolymers. Such fluoropolymers include polytetrafluoroethylene (PTFE), tetrafluoroethylene-hexafluoropropylene (FEP), modified tetrafluoroethylene-hexafluoropropylene (mFEP), perfluoroalkoxyethylene (PFA), modified perfluoroalkoxyethylene (mPFA), ethylene-tetrafluoroethylene (ETFE), tetrafluoro-ethylene-perfluoro (methyl vinyl ether) (MFA), modified polytetrafluoroethylene (TFM), polyvinylidene fluoride (PVDF), ethylene-chlorotrifluoroethylene (ECTFE), and combination thereof.

The fluoropolymer can be present in an amount of at least 0.1 to 5 wt %, 0.2 to 4 wt %, or 0.3 to 3 wt %.

Another aspect of the present disclosure is to provide a stain repellent coating in wall and ceiling coverings. A ceiling tile having such stain repellency is more efficiently prevented from getting dirty during installation or use. Moreover, it is an object to provide a method for mounting an improved suspended ceiling.

A further object of the present invention is to provide an improved ceiling tile which is adapted to be mounted in a grid of profiles forming a frame which supports the ceiling tile. The ceiling tile has a first and a second pair of non-adjacent side-edge portions, wherein the grid of profiles engage from below with the first pair of side-edge portions, and wherein the grid of profiles engage from above with the second pair of side-edge portions. The grid of profiles engages with said first and second pair of side-edge portions such that a clamping action that counteracts lateral displacement of the ceiling tile is provided. The ceiling tile has further a coating as described herein.

An advantage of the present inventive concept is that the ceiling tile is prevented from getting dirty or stained during installation employing a locking system that secures the tile to a suspended frame. The ceiling tile includes side-edge portion of the ceiling tile may be a part of an underside of the ceiling tile, a part of an upper side of the ceiling tile, a groove or cavity provided in a side portion of the ceiling tile, a protrusion provided in a side portion of the ceiling tile, etc.

In particular, there is reduced cleaning requirement for the ceiling since any part of the suspended ceiling comprising the coating. Thus, in a mounted state the ceiling tiles comprised in the inventive suspended ceiling are more efficiently prevented from involuntary staining which may be caused by a wind uplift, impacts from objects, forces applied to the ceiling panel from below, e.g. during a cleaning process, a sudden change of air pressure in the room when a door connected to the room is abruptly opened, etc.

By means of the clamping action, or frictional fit, the ceiling tile can be fixed in a lateral position, being restrained by friction. Preferably, the clamping action is such that the ceiling tile is kept fixed at least in a first lateral direction. More preferably, the clamping action is such that the ceiling tile is kept fixed in two perpendicular lateral directions.

The following represents an exemplary list of embodiments in accordance with the invention:

Item 1. A coating dispersion, the coating dispersion comprising:
water;
titanium dioxide;
calcium carbonate;
calcined aluminum silicate;
acrylic polymers;
a dihydrazide; and
a fluoroalkyl polymer.

Item 2. The coating dispersion according to item 1, wherein the amount of titanium dioxide is at least 5 wt %, at least 6 wt %, or at least 7 wt %, and not greater than 15 wt %, not greater than 12 wt %, or not greater than 10 wt %.

Item 3. The coating dispersion according to item 1, wherein the amount of calcium carbonate is at least 18 wt %, at least 23 wt %, or at least 28 wt %, and not greater than 35 wt %, not greater than 32 wt %, or not greater than 30 wt %.

Item 4. The coating dispersion according to item 1, wherein the amount of calcined aluminum silicate is at least 5 wt %, at least 6 wt %, or at least 7 wt %, and not greater than 12 wt %, not greater than 10 wt %, or not greater than 8 wt %.

Item 5. The coating dispersion according to item 1, wherein the amount of acrylic polymers is at least 7 wt %, at least 10 wt %, or at least 13 wt %, and not greater than 20 wt %, not greater than 17 wt %, or not greater than 14 wt %.

Item 6. The coating dispersion according to item 1, wherein the amount of the dihydrazide is at least 0.1 wt %, at least 0.15 wt %, or at least 0.18 wt %, and not greater than 0.5 wt %, not greater than 0.4 wt %, or not greater than 0.3 wt %.

Item 7. The coating dispersion according to item 1, wherein the amount of the a fluoroalkyl polymer is at least 0.2 wt %, or at least 0.3 wt %, at least 0.35 wt %, and not greater than 0.9 wt %, not greater than 0.7 wt %, or not greater than 0.4 wt %.

Item 8. The coating dispersion according to any of the foregoing items, further comprising at least one ingredient selected from the group of Magnesium silicate, anhydrous aluminum silicate, or a mixture thereof.

Item 9. The coating dispersion according to item 8, wherein the at least one ingredient is present in an amount of at least 2 wt %, at least 4 wt %, or at least 6 wt %, and not greater than 12 wt %, not greater than 10 wt %, or not greater than 8 wt %.

Item 10. The coating dispersion according to any of the foregoing items, further comprising zinc oxide.

Item 11. The coating dispersion according to item 10, wherein the zinc oxide is present in an amount of at least 0.2 wt %, at least 0.4 wt %, or at least 0.6 wt %, and not greater than 1.2 wt %, not greater than 1 wt %, or not greater than 0.8 wt %.

Item 12. A building article comprising a coating, wherein the coating includes:
titanium dioxide, calcium carbonate, calcined aluminum silicate, acrylic polymers, a dihydrazide, and a fluoroalkyl polymer.

Item 13. The building article according to item 12, wherein the amount of calcium carbonate is at least 25 wt %, at least 30 wt %, or at least 35 wt %, and not greater than 55 wt %, not greater than 50 wt %, or not greater than 45 wt %.

Item 14. The building article according to item 12, wherein the amount of titanium dioxide is at least 6 wt %, at least 8 wt %, or at least 10 wt %, and not greater than 16 wt %, not greater than 14 wt %, or not greater than 12 wt %.

Item 15. The building article according to item 12, wherein the amount of calcined aluminum silicate is at least 6 wt %, at least 8 wt %, or at least 10 wt %, and not greater than 16 wt %, not greater than 14 wt %, or not greater than 12 wt %.

Item 16. The building article according to item 12, the amount of acrylic polymers is at least 10 wt %, at least 15 wt %, or at least 18 wt %, and not greater than 30 wt %, not greater than 25 wt %, or not greater than 22 wt %.

Item 17. The building article according to item 12, wherein the amount of the dihydrazide is at least 0.15 wt %, at least 0.2 wt %, or at least 0.25 wt %, and not greater than 0.6 wt %, not greater than 0.5 wt %, or not greater than 0.4 wt %.

Item 18. The building article according to item 12, the amount of the a fluoroalkyl polymer is at least 0.2 wt %, or at least 0.3 wt %, at least 0.35 wt %, and not greater than 1 wt %, not greater than 0.8 wt %, or not greater than 0.6 wt %.

Item 19. The building article according to item 12 further comprising at least one ingredient selected from the group of Magnesium silicate, anhydrous aluminum silicate, or a mixture thereof.

Item 20. The building article according to item 19, wherein the at least one ingredient is present in an amount of at least 2 wt %, at least 4 wt %, or at least 6 wt %, and not greater than 20 wt %, not greater than 16 wt %, or not greater than 12 wt %.

Item 21. The building article according to item 12, further comprising zinc oxide.

Item 22. The building article according to item 22, wherein the zinc oxide is present in an amount of at least 0.5 wt %, at least 0.7 wt %, or at least 0.9 wt %, and not greater than 2 wt %, not greater than 1.5 wt %, or not greater than 1.2 wt %.

Item 23. The coating dispersion or building article according to any one of the preceding items, wherein the dihydrazide is selected from isophthalic dihydrazide, sebacic dihydrazide, adipic dihydrazide, or any combination thereof.

Item 24. The building article according to any one of items 12-24, wherein the building article includes a tile, a mineral board, a gypsum board, fiberglass, or any combination thereof.

Item 25. The building article according to any one of items 12-24, wherein coating has a thickness of at least 1 mil, at least 2 mils, or at least 3 mils, and not more than 6 mils, 5 mils, or 4 mils.

The following example makes it possible to illustrate the invention without however limiting it.

Example 1 a) Preparing a Coating Dispersion

Into a container, 1563.04 g of water, 10.4 g of adipic acid dihydrazide, 2.4 g of Surfynol (surfactant), 5.6 g of hydrocracked parafinnic oil (90%), 2.3 g of sodium polyacrylate emulsion (43%), 395 g of titanium dioxide, 1410 g of precipitated calcium carbonate, 160 g of Magnesium silicate, 350 g of calcined aluminum silicate, 150 g of anhydrous aluminum silicate (calcined kaolin), 674 g of acrylic polymers, 71.6 g of zinc oxide dispersion (50 wt %), 95 g of fluoroalkyl methacrylate copolymer, and 27.4 g of polyethylene acrylate mixture are mixed. The mixture was painted on an gypsum board panel and air-dried.

b) Compliance Test

A panel having the coating was submitted to berkeley analytical for VOC Emission testing in accordance with California Department of Public Health standard CDPH/EHLB/Standard Method V1.1-2010. The result was the panel was complain to School classroom and private office criteria with formaldehyde amounts at less than 9 micrograms/m$^3$.

c) Stain Removal

Stain Removal was conducted according to ASTM Standard D4828 using method reference 8.7 and 8.4 on an actual panel Tables 1-3 show the results.

TABLE 1

| Stain/Soil | Rating <100 double rubs Bleach soln. | Rating <100 double rubs Quat NH soln. |
|---|---|---|
| Betadine (H brand) | 10 | 10 |
| Mustard (French's) | 3 | 3 |

TABLE 1-continued

| Stain/Soil | Rating <100 double rubs Bleach soln. | Rating <100 double rubs Quat NH soln. |
|---|---|---|
| Cola (Coca Cola) | 10 | 10 |
| Coffee (Starbucks) | 5 | 5 |
| Ketchup (Heinz) | 10 | 10 |

TABLE 2

| Stain/Soil | Rating <100 double rubs EtOH soln. | Rating <100 double rubs Peroxide soln. |
|---|---|---|
| Betadine (H brand) | 10 | 10 |
| Mustard (French's) | 3 | 3 |
| Cola (Coca Cola) | 10 | 10 |
| Coffee (Starbucks) | 5 | 5 |
| Ketchup (Heinz) | 10 | 10 |

0: No change from original intensity (depth) of soil or stain,

3: Slight change from original, but readily visible,

5: Moderate change from original, slightly visible,

7: Large change from original, barely visible, and

10: All soil and stain removed.

TABLE 3

| | 1000 wash cycles | 2000 wash cycles | 2500 wash cycles | 5000 wash cycles |
|---|---|---|---|---|
| Gloss change | N | N | N/I | I |
| Color change | N | N | N | SD |
| Erosion | N | S | S | S |

| Gloss Change | Color Change | Erosion |
|---|---|---|
| N—None | N—None | N—None |
| I—Increase | SD—Slightly darker | S—Slight |
| II—Large increase | CD—Considerably darker | M—Moderate |
| D—Decrease | SL—Slightly lighter | |
| DD—Large decrease | CL—Considerably lighter | |

What is claimed is:

1. A coating dispersion, the coating dispersion comprising:

water;

titanium dioxide;

calcium carbonate;

calcined aluminum silicate;

acrylic polymers present at an amount not greater than 20 wt % of the coating;

a dihydrazide; and a fluoroalkyl polymer present at an amount of 0.1 wt % to 5 wt % of the coating, wherein the fluoroalkyl polymer includes a fluoroalkyl methacrylate copolymer.

2. The coating dispersion according to claim 1, wherein the amount of titanium dioxide is at least 5 wt % of the coating dispersion.

3. The coating dispersion according to claim 1, wherein the amount of calcium carbonate is at least 18 wt % of the coating dispersion.

4. The coating dispersion according to claim 1, wherein the amount of calcined aluminum silicate is at least 5 wt % of the coating dispersion.

5. The coating dispersion according to claim 1, wherein the amount of acrylic polymers is at least 7 wt % of the coating dispersion.

6. The coating dispersion according to claim 1, wherein the amount of the dihydrazide is at least 0.1 wt % of the coating dispersion.

7. The coating dispersion according to claim 1, wherein the amount of the a fluoroalkyl polymer is 0.2 wt % to 4 wt % of the coating dispersion.

8. The coating dispersion according to claim 1, further comprising at least one ingredient selected from the group of Magnesium silicate, anhydrous aluminum silicate, or a mixture thereof.

9. The coating dispersion according to claim 8, wherein the at least one ingredient is present in an amount of at least 2 wt % of the coating dispersion.

10. The coating dispersion according to claim 1, further comprising zinc oxide.

11. The coating dispersion according to claim 10, wherein the zinc oxide is present in an amount of at least 0.2 wt % of the coating dispersion.

\* \* \* \* \*